US008662717B2

(12) United States Patent
Sinai et al.

(10) Patent No.: US 8,662,717 B2
(45) Date of Patent: Mar. 4, 2014

(54) INDUCTION LUMINAIRE WITH QUICK ACCESS ENCLOSURE

(76) Inventors: Saman Sinai, Commerce, CA (US); Bejamin Pouladian, Commerce, CA (US)

( * ) Notice: Subject to any disclaimer, the term of this patent is extended or adjusted under 35 U.S.C. 154(b) by 208 days.

(21) Appl. No.: 13/292,994

(22) Filed: Nov. 9, 2011

(65) Prior Publication Data

US 2013/0114271 A1 May 9, 2013

(51) Int. Cl.
*B60Q 3/04* (2006.01)

(52) U.S. Cl.
USPC ............................ 362/362; 362/365; 362/431

(58) Field of Classification Search
USPC .......................................... 362/362, 365, 431
See application file for complete search history.

(56) References Cited

U.S. PATENT DOCUMENTS

2002/0018344 A1* 2/2002 Sears et al. .................... 362/265
2008/0209624 A1* 9/2008 Lavoie et al. ..................... 4/449
2012/0087118 A1* 4/2012 Bailey et al. ................. 362/235

* cited by examiner

*Primary Examiner* — Evan Dzierzynski

(74) *Attorney, Agent, or Firm* — Omni Legal Group; Omid E. Khalifeh

(57) ABSTRACT

One embodiment of an induction luminaire which allows quick and safe access to the light pole gasket, bolt-down clamps, step-down transformer, surge protector, and the ballast is envisioned. Said luminaire may have hydraulic support member that allows the maintenance enclosure lid to remain open while shielding parts beneath it. One embodiment of the luminaire includes a separate compartment adjacent the lamp enclosure and below the maintenance enclosure which contains the ballast.

4 Claims, 4 Drawing Sheets

INDUCTION LUMINAIRE WITH QUICK ACCESS ENCLOSURE

CROSS-REFERENCE TO RELATED APPLICATIONS

None

BACKGROUND

The following is a tabulation of some prior art that presently appears relevant:

| U.S. Patents | | | |
|---|---|---|---|
| Pat. No. | Kind Code | Issue Date | Patentee |
| 5,829,866 | A | Nov. 3, 1998 | Stegeman |
| 7,364,328 | B2 | Apr. 29, 2008 | Lee et al. |
| 7,430,120 | B2 | Sep. 30, 2008 | Lau |
| 7,597,450 | B2 | Oct. 6, 2009 | Garrett |
| U.S. Patent Application Publications | | | |
| Publication Number | Kind Code | Publ. Date | Applicant |
| None found | | | |

Foreign Patent Document

None found

Nonpatent Literature Documents

None found

NOTICE OF COPYRIGHT AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

DISCUSSION OF THE RELATED ART

Induction lamps are electrodeless lamps that typically include a vitreous envelope containing a discharge medium, with the envelope being shaped for operation with an electrical excitation coil. The excitation coil excites the discharge medium to emit light through the induction of electric current in the discharge medium. Typical rated life of an induction lighting system is 100,000 hours. This is determined by the life of the electronic ballast and not the lamp components.

Conventional streetlamps are considered having the disadvantages of high power consumption and short lifetime. The long life of electrodeless lamps makes them ideal for use in street lamps. The less frequent maintenance associated with longer system life means reduction in traffic on roads and highways typically shut down by workers repairing these systems. Nevertheless, these systems do sometimes need to be maintained and there are difficulties inherent to performing repair and maintenance high up on streetlamps.

The procedure of maintaining streetlamps in street lighting luminaires, which is to be carried out usually from a cherry picker on account of the height of the masts used, is relatively time-consuming. The height and fact that they are sometimes situated near busy roads and highways means workers who need to perform repair and maintenance thereon are exposed to dangerous situations.

As such, there is a need to provide an induction lighting street lamp with an improved structure that allows installation and maintenance to be performed more quickly and safely. There are a number of induction lamps which have been suggested. Nevertheless, they all fail to provide maintenance workers with quick and easy access to all the primary components of an induction lighting fixture while shielding the contents of the enclosure.

Furthermore, many of these devices fail to allow access to the fixture support member by opening the same enclosure housing the step-down transformer and the surge protector. This means maintenance workers must spend more time screwing and unscrewing compartments than if all these components were located within one enclosure. The end result is more time spent high above the ground endangering the workers life through prolonged exposure to an unsafe environment.

An induction lamp with a quick access enclosure to allow maintenance workers access to the lamp's support member, step-down transformer, and surge protector is a desirable tool for improving efficiency and maintenance worker safety.

Even though several types of electrodeless lighting fixtures have been proposed, all of the systems heretofore known suffer from a number of disadvantages:

(a) the known electrodeless lighting fixtures do not contain a support member gasket in the same compartment as the step down transformer and the surge protector;
(b) the known electrodeless lighting fixtures do not have a single maintenance enclosure with a cover propped open by a support member;
(c) the known electrodeless lighting fixtures do not have a maintenance cover that opens vertically and remains propped open in the same position until the maintenance worker has completed their work;
(d) the known electrodeless lighting fixtures do not have a housing for the surge protector in the same enclosure as the step-down transformer;
(e) the known electrodeless lighting fixtures do not contain a housing to hold the step-down transformer securely in place;
(f) the known electrodeless lighting fixtures do not contain a housing to hold the surge protector securely in place;
(g) the known electrodeless lighting fixtures do not have a maintenance cover that is hinged at the front; and
(h) the known electrodeless lighting fixtures expose the contents of the maintenance enclosure to the elements such as snow and rain while the maintenance worker is repairing it.

Therefore, there is a need for an improved lighting fixture which allows quick access to the maintenance enclosure while shielding the contents from potentially harmful weather conditions. Such a lighting fixture is necessary to allow for more efficient and less time consuming maintenance on electrodeless lighting fixtures. The present invention effectuates these needs.

SUMMARY

In accordance with one embodiment, an induction luminaire which allows quick and safe access to the light pole gasket, bolt-down clamps, step-down transformer, and surge protector is envisioned. Said luminaire may have a hydraulic support member that allows the maintenance enclosure lid to remain open while shielding parts beneath it. One embodiment of the luminaire includes a separate compartment adjacent the lamp enclosure and below the maintenance enclosure which contains the ballast.

It is envisioned that in one embodiment the maintenance enclosure lid will be connected to the rest of the luminaire at one end by a hinge located above the lamp enclosure. The hinge is positioned so as to allow the enclosure lid to be opened and closed vertically. Lifting the unhinged end of the enclosure lid exposes the contents of the maintenance enclosure while still providing shelter from potentially harmful weather such as rain or snow.

In one embodiment of the induction luminaire with quick access enclosure, the maintenance enclosure lid will also be connected to a support member. The support member will attach to the lid on one end while connected to the interior of the maintenance enclosure on the other. In one embodiment, said support member may be hydraulic. In one embodiment of the luminaire, the support member may be attached to the maintenance enclosure adjacent to the light pole housing.

In another embodiment, the maintenance enclosure will contain a housing to accommodate a light pole and hold it securely in place. One end of the housing will contain a set of parallel mounting steps in one embodiment. One end of the light pole will rest against these steps and determine the angle of the luminaire with respect to the pole and the ground. The light pole will be held in place by a gasket and pipe clamp over the top of said housing.

In one embodiment, the maintenance enclosure will contain a housing for a step-down transformer. This housing may be situated towards the middle of the maintenance enclosure between the light pole housing and the surge protector housing. This housing will hold the step-down transformer in place once it is installed in the maintenance enclosure. The transformer will be secured over the top through the use of a clamp.

In yet another embodiment, the maintenance enclosure may also contain a surge protector housing. This housing will aid in keeping the surge protector securely in place once it is installed in the maintenance enclosure. The surge protector will be held in the housing with at least one clamp which may be placed over the top of said housing. In one embodiment, the housing may be located adjacent to the step-down transformer housing at the end of the maintenance enclosure opposite the light pole housing.

One embodiment of the luminaire with quick access enclosure may have a separate compartment to contain at least one ballast. This compartment may be located on the back of the luminaire so the person working on the ballast may open it from the same side as they would open the maintenance enclosure lid. In one embodiment, the ballast enclosure lid may be connected to the ballast enclosure even after the lid has been unscrewed and opened. Such a connection means would be capable of preventing the ballast enclosure lid from falling off once it is unscrewed.

One example of such a connection means would be the use of at least one support cable. The support cable may be connected to the inside of the ballast enclosure on one end and to the inside of the ballast enclosure lid on the other. Once unscrewed and separated from the rest of the luminaire, the ballast enclosure lid would then hang loosely from the luminaire. The cable would then obviate the need for a worker to hang on to the lid while working on the ballast.

The inventors envision that, in another embodiment of the luminaire, more than one support cable may be used to connect the ballast enclosure lid to the ballast enclosure. It is further envisioned that the luminaire with quick access enclosure may contain more than one illumination means. Accordingly, the inventors envision that more than one ballast may be necessary to drive the individual illumination means. Therefore, in another embodiment, the ballast enclosure may contain more than one ballast.

In yet another embodiment, the ballast enclosure lid and the ballast enclosure may be lined with cooling fins. These cooling fins assist in dissipating heat generated by the ballast when it is used for a prolonged period of time.

ADVANTAGES

Thus several advantages of one or more aspects are to provide:

- (a) a luminaire which reduces the amount of time maintenance workers require to work on street lamps;
- (b) a luminaire which shields the contents of the maintenance enclosure from harmful weather elements while the light fixture is being worked on;
- (c) a luminaire with a lid that can be held partially open by a support member while being worked on by a maintenance worker;
- (d) a luminaire that has a separate surge protector housing to keep the surge protector securely in place;
- (e) a luminaire that has a separate step-down transformer housing to keep to step down transformer securely in place;
- (f) a luminaire that has a separate light pole housing to keep the light pole securely in place; and
- (g) a luminaire that has all three of the aforementioned housings within a single maintenance enclosure with quick access lid that can remain partially ajar because it has a support member.

These and other advantages of one or more aspects will become apparent from consideration of the ensuing description and accompanying drawings. Although the description above contains many specificities, these should not be construed as limiting the scope of the embodiments but as merely providing illustrations of some of several embodiments. For example, the luminaire may be constructed with one hydraulic support member in one embodiment and with two such support members in another. Thus the scope of the embodiments should be determined by the claims that are appended and their legal equivalents, rather than by the examples given.

The description of the invention which follows, together with the accompanying drawings should not be construed as limiting the invention to the example shown and described, because those skilled in the art to which this invention pertains will be able to devise other forms thereof within the ambit of the appended claims.

DESCRIPTION OF THE DRAWINGS

Figures

Figure 1:
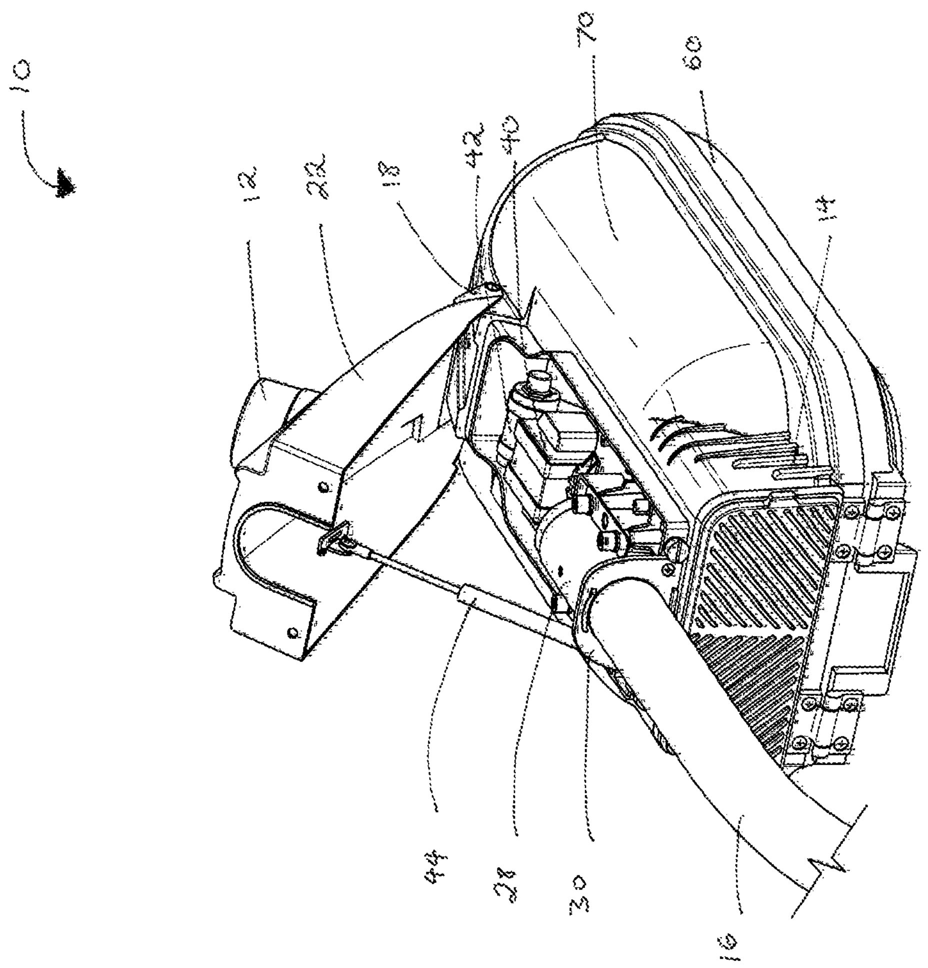
FIG. 1 is a perspective view of the luminaire illustrated as shown facing the ballast-end with the maintenance enclosure lid open.

| Reference Numerals | | | |
|---|---|---|---|
| 10 | luminaire | 12 | photo cell |
| 14 | cooling fins | 16 | light pole |
| 18 | hinge | 20 | maintenance enclosure |
| 22 | maintenance enclosure lid | 24 | light pole housing |
| 26 | mounting steps | 28 | light pole clamp |
| 30 | light pole gasket | 32 | step-down transformer housing |
| 34 | step-down transformer clamp | 36 | surge protector housing |
| 38 | surge protector clamp | 40 | step-down transformer |
| 42 | surge protector | 44 | support member |
| 50 | ballast enclosure | 52 | ballast enclosure lid |
| 54 | support cable | 60 | lamp enclosure |
| 70 | luminaire housing | | |

DETAILED DESCRIPTION

Illustrative embodiments of the invention are described below. The following explanation provides specific details for a thorough understanding of an enabling description for these embodiments. One skilled in the art will understand that the invention may be practiced without such details. In other instances, well-known structures and functions have not been shown or described in detail to avoid unnecessarily obscuring the description of the embodiments.

One embodiment of an induction luminaire with quick access enclosure 10 is illustrated in FIGS. 1, 2, 3, 4, and 5. When used correctly, this luminaire 10 will allow maintenance workers to quickly access the primary components of the luminaire 10 such as the surge protector 42 and step-down transformer 40, to install and maintain, the luminaire while shielding these components from weather conditions that may potentially be harmful to the luminaire.

The luminaire 10 is comprised three primary enclosures. These are the maintenance enclosure 20 (FIGS. 1, 2, and 3), the ballast enclosure 50 (FIGS. 4 and 5), and the lamp enclosure 60 (FIG. 1). The lamp enclosure 60 contains the illumination means which, in one embodiment, may be a single electrodeless discharge lamp such as an induction lamp. However, in another embodiment, it is envisioned that the lamp enclosure 60 may be modified to accommodate multiple lamps. Some of the lamps may be induction while in other embodiments there may be other illumination means such as light emitting diode (LED) bulbs.

Both the maintenance enclosure 20 and the ballast enclosure 50 can be accessed from the rear of the luminaire 10. This makes it easy for maintenance workers installing the luminaire 10 or performing routine maintenance on it to do their job without some of the complexities typically associated with their work.

The maintenance enclosure 20 is where the surge protector 42, the step-down transformer 40, and the light pole 16 are installed in the luminaire 10. The maintenance enclosure 20 is covered by a maintenance enclosure lid 22. In one embodiment, the maintenance enclosure lid 22 may be connected to the rest of the luminaire housing 70 by a hinge 18. In one embodiment, this hinge may be found on one end of the lid 22 opposite the light pole 16.

Referring to FIG. 1, in one embodiment of the luminaire 10, it may be equipped with a photocell 12. This photocell 12 can be installed on the top of the maintenance enclosure lid 22. In one embodiment of the photocell 12, it may be rotatable three hundred and sixty degrees.

The maintenance enclosure lid 22 covers the maintenance enclosure 20 when it is closed. The maintenance enclosure lid 22 may be opened vertically by lifting up the back side of the lid opposite the maintenance enclosure hinge 18. When it is open, the maintenance enclosure lid 22, may be propped up through the use of a support member 44. In one embodiment of the support member 44, it may be hydraulic. In one embodiment, the support member 44 may be connected to the luminaire housing 70 in the maintenance enclosure 20 adjacent to the light pole housing 24 as seen in FIG. 3.

It is envisioned that more than one support member may be used to hold the maintenance enclosure lid 22 open while the luminaire 10 is being worked on by a maintenance worker. In one embodiment, there may be a second support member situated on the opposite side of the light pole housing 24 as the first support member 44. In one embodiment, the second support member may be hydraulic.

Figure 3:
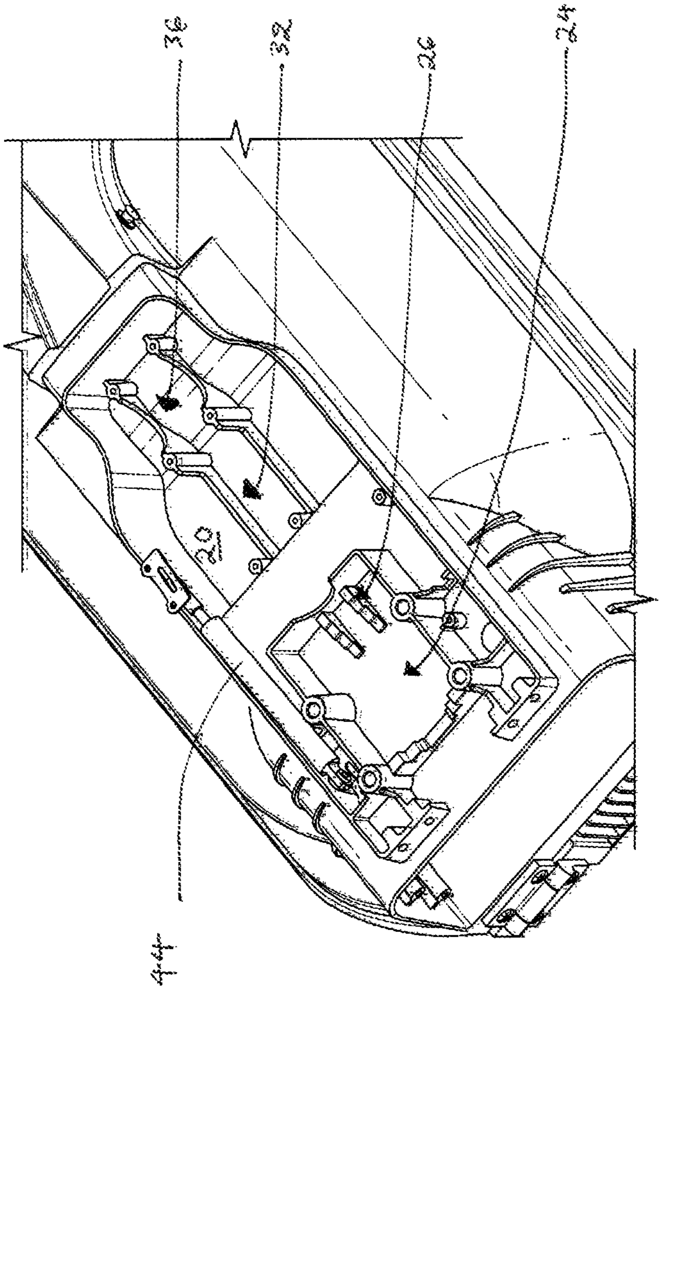
FIG. 3 is a top perspective view of a luminaire with the maintenance enclosure lid, lamp pole gasket and clamp, the surge protector, and the step-down transformer removed to illustrate the different maintenance enclosure housings.

FIG. 3 is exemplary of the maintenance enclosure 20 with the light pole 16, surge protector 42, and step-down transformer 40 removed to illustrate housings contained therein. In one embodiment, the maintenance enclosure 20 may contain three separate housings. Towards the back of the maintenance enclosure 20 is the light pole housing 24. In one embodiment of the light pole housing 24, it may contain a series of mounting steps 26 that may be used to adjust the angle of the luminaire 10 with respect to the ground when the luminaire 10 is being mounted onto one end of a light pole 16.

FIG. 3 also illustrates the step-down transformer housing 32 and the surge protector housing 36. In one embodiment of the luminaire 10, the step-down transformer housing 32 may be located in the maintenance enclosure 20 between the light pole housing 24 and the surge protector housing 36. In which case, the surge protector housing 36 would be placed in the maintenance enclosure 20 on the side furthest away from the light pole housing 24.

Figure 2:
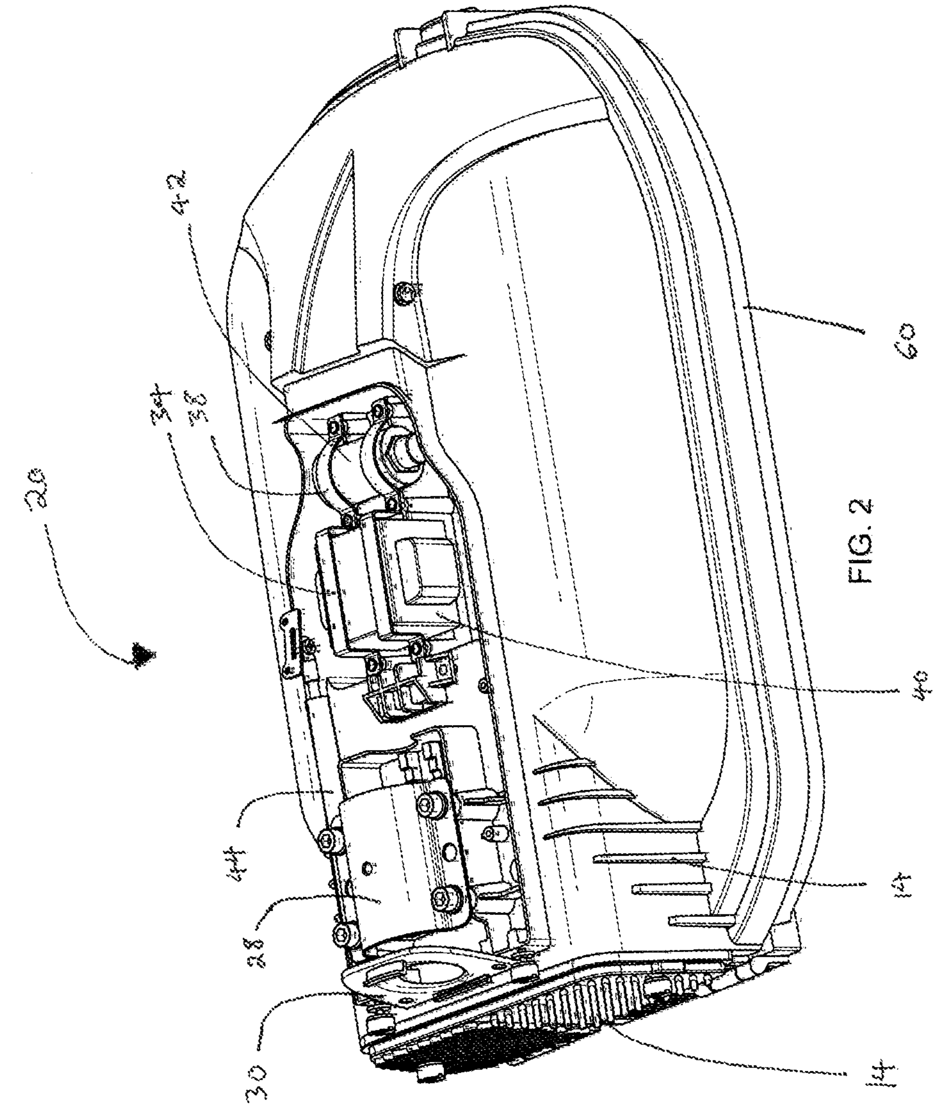
FIG. 2 is a side perspective view of a luminaire with the maintenance enclosure lid and lamp pole removed to show the inside of the maintenance enclosure.

FIG. 2 is exemplary of the maintenance enclosure 20 with the maintenance enclosure lid 22 removed to illustrate how the light pole, step down transformer 40, and surge protector 42 may be held securely in place within their respective housings.

The light pole may be held in place by a gasket 30 through which the light pole may pass and a clamp 28 may be placed over the top. The step-down transformer 40 is held in place in the step-down transformer housing through the use of at least one clamp 34 over the top of the step-down transformer 40. Similarly, the surge protector 42 is held securely in place within the surge protector housing through the use of at least one clamp 38 over the top of the surge protector 42.

Figure 5:
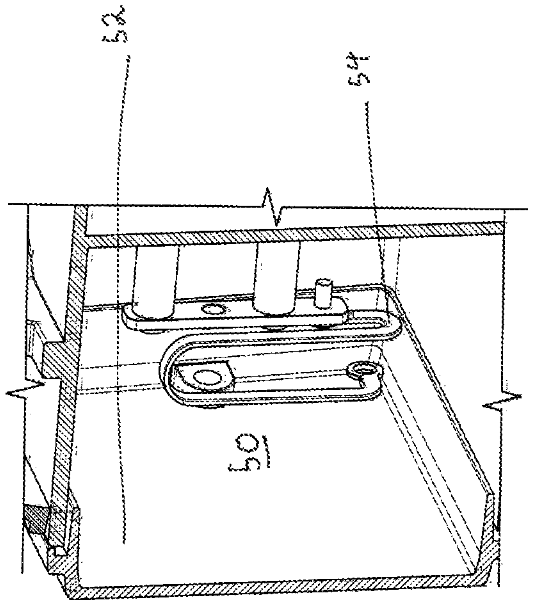
FIG. 5 is a perspective view of the inside of the ballast enclosure while the ballast enclosure lid is closed illustrating the position of the support cable.
Figure 4:
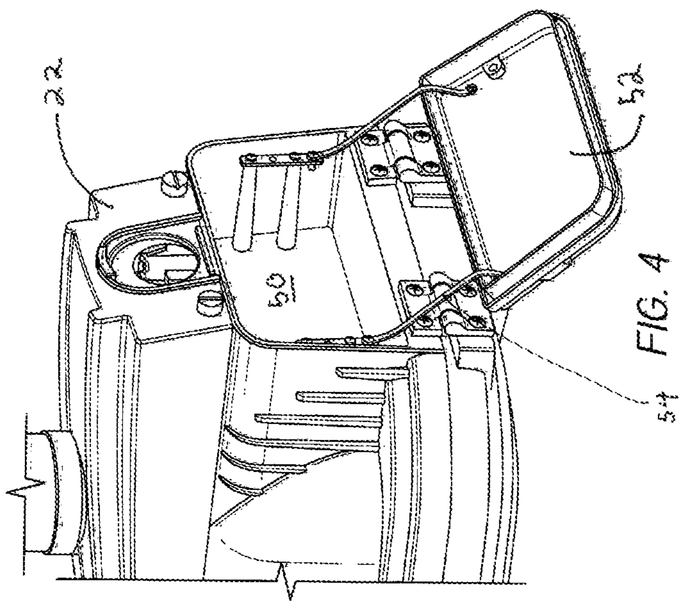
FIG. 4 is a left perspective view of a luminaire with the ballast enclosure lid open.

FIG. 2 also illustrates a series of cooling fins 14 which line the outside of the ballast enclosure 50 (FIGS. 4 and 5). These fins 14 aid dissipating heat generated by the ballast when it is used for prolonged periods of time.

Referring to FIG. 4, this figure illustrates the rear of the luminaire 10 with the maintenance enclosure lid 22 closed to conceal the contents of the maintenance enclosure 20. This figure also illustrates the ballast enclosure 50 and the ballast enclosure lid 52 while open and with the ballast removed. The ballast enclosure lid 52 is illustrated as being connected to the ballast enclosure 50 by a cable 54. In this embodiment, there are two cables 54 however, it is envisioned that the number of cables may vary in different embodiments.

FIG. 5 is exemplary of the positioning of one support cable 54 when the ballast enclosure lid 52 is closed. This cable 54 is connected to the ballast enclosure lid 52 at one end, and to the inside of the ballast enclosure 50 on the other.

CONCLUSIONS, RAMIFICATIONS, AND SCOPE

While a particular form of the invention has been illustrated and described, it will be apparent that various modifications can be made without departing from the spirit and scope of the invention. For example, the manner in which the surge protector is secured in place over the top may be implement by a variety of different means other than a clamp. Accordingly, is not intended that the invention be limited, except as by the appended claims.

The teachings provided herein can be applied to other systems, not necessarily the system described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Particular terminology used when describing certain features or aspects of the invention should not be taken to imply that the terminology is being refined herein to be restricted to any specific characteristics, features, or aspects of the luminaire with which that terminology is associated. In general, the terms used in the following claims should not be constructed to limit the luminaire to the specific embodiments disclosed in the specification, unless the above Detailed Description section explicitly define such terms. Accordingly, the actual scope encompasses not only the disclosed embodiments, but also all equivalent ways of practicing or implementing the disclosed luminaire. The above detailed description of embodiments of the luminaire is not intended to be exhaustive or limited to the precise form disclosed above or to a particular field of usage. While specific embodiments of, and examples for, the luminaire are described above for illustrative purposes, various equivalent modifications are possible which those skilled in the relevant art will recognize.

While certain aspects of the luminaire are presented below in particular claim forms, the inventors contemplate the various aspects of the luminaire in any number of claim forms. Accordingly, the inventors reserve the right to add additional claims after filing the application to pursue such additional claim forms for other aspects of the luminaire.

What is claimed is:

1. A method of constructing an induction luminaire comprising:

providing luminaire housing with a maintenance enclosure comprising a light pole housing, a surge protector housing, and a step-down transformer housing;

providing a maintenance enclosure lid;

providing a support member;

connecting one end of the maintenance enclosure lid to said luminaire housing;

connecting one end of said support member to inside of said maintenance enclosure and the other end of said support member to inside of the said maintenance enclosure lid;

providing a ballast enclosure, ballast enclosure lid, and a support cable having a first end and a second end;

connecting said support cable first end to said ballast enclosure; and connecting said support cable second end to said ballast enclosure lid.

2. The method of claim 1 further comprising the steps of:

providing a second support cable with a first end and a second end;

connecting said support cable first end to said ballast enclosure; and connecting said support cable second end to said ballast enclosure lid.

3. The method of claim 1 wherein said ballast enclosure lid is lined with cooling fins.

4. The method of claim 1 wherein said ballast enclosure is lined with cooling fins.

* * * * *